Nov. 16, 1926.
C. R. WELSH
STORAGE BATTERY ELECTROLYTE LEVEL INDICATOR
Filed July 1, 1925
1,607,031
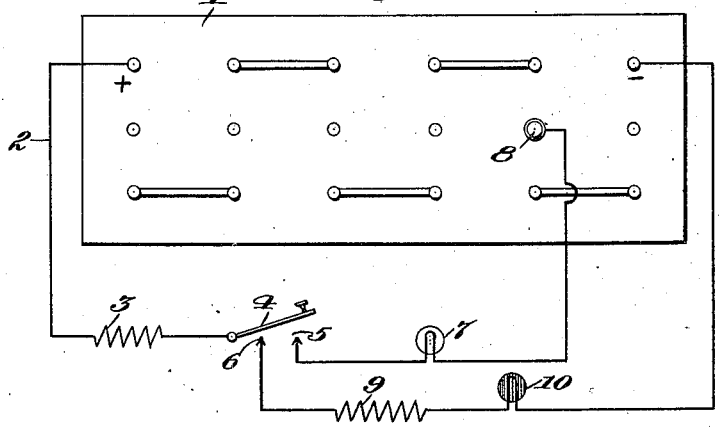
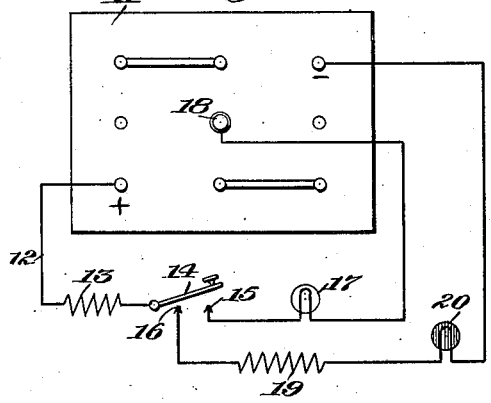
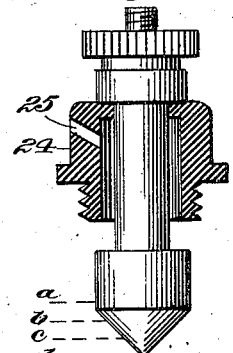
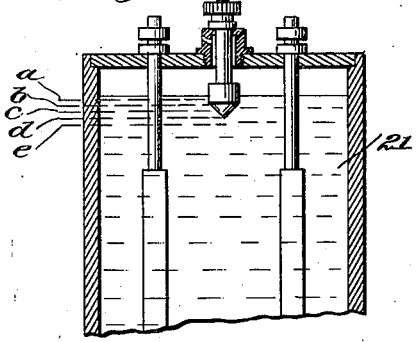
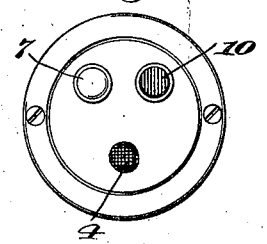
Inventor:
Charles R. Welsh,
by Joseph W. Harris
Atty.

Patented Nov. 16, 1926.

1,607,031

UNITED STATES PATENT OFFICE.

CHARLES R. WELSH, OF HONOLULU, TERRITORY OF HAWAII.

STORAGE-BATTERY ELECTROLYTE-LEVEL INDICATOR.

Application filed July 1, 1925. Serial No. 40,811.

This invention relates to a method of and means for indicating the level of electrolyte in a storage battery, such, for example, as one used on automobiles.

An object of the invention is to provide a means of indicating the level of the electrolyte in a storage battery, whereby it may be determined if it is necessary to add water to the battery;

A further object is to provide such a means that may be placed on the instrument board of an automobile;

A further object is to provide such a means that is operated electrically but that does not consume electric energy when not indicating;

A further object is to provide a cheap and simple indicator that may be quickly installed, that does not get out of order, and that gives reliable signals.

In the accompanying drawings,

Figure 1 is a diagram of the circuits for a twelve volt battery indicator;

Fig. 2 is a diagram of the circuits for a six volt battery indicator;

Fig. 3 is a view of a tapered metal plug which projects into the electrolyte to a greater or less extent as the level of the electrolyte varies;

Fig. 4 is a front view of the indicator, showing the lamps and the push button; and Fig. 5 is a view of the cone pointed plug in a cell, showing the electrolyte at different levels in dotted lines.

In Figure 1, a twelve volt battery 1 is shown with a wire 2 connected to the positive pole of the battery and connected to a resistance 3, which may have a value of about thirty ohms, the circuit continuing to the key of the push button 4. The push button is provided with double lower contacts 5 and 6, both of which are in circuit when the button is pressed, the contact 5 is connected with a circuit which passes through the white light 7, and to the contactor plug 8 of the storage battery. The contact 6 of the push button 4 is connected to a resistance 9 which may have an approximate value of ten ohms, and then through the red light 10, to the negative pole of the battery.

In Fig. 2 a six volt battery 11 is shown with a circuit 12 connected to a resistance 13, which may have a value of approximately six ohms, and then to the key of the push button 14. The push button is provided with double lower contacts 15 and 16, the contact 15 of which is connected to a white light 17, and then to the plug 18. The contact 16 is connected to a resistance 19 which may have a value of approximately two ohms, and then through the red light 20 to the negative pole of the battery.

As the level of the electrolyte 21 in the battery varies, a greater or less extent of the cone shaped end of plug 8 will be immersed as shown in dotted line $a$, $b$, $c$, $d$, and $e$ in Fig. 5. With the electrolyte at its correct level "$a$", or higher, the white light of the indicator will burn brightly, and the red light dimly on pressing the push button 4 and closing both circuits through lights 7 and 10. As the level of the electrolyte drops, as shown at "$b$", "$c$", and "$d$", the resistance at the cone of plug 8 and the electrolyte will gradually increase, until the circuit is finally broken when the electrolyte 21 is below the point of the cone, as at "$e$". As the electrolyte level drops, and the resistance at the contact with the cone end increases, the white light will be less bright, and the red light brighter, on pressing the button 4; when the electrolyte level is below the end of the cone end, as at "$e$" the circuit through the white light 7 will be broken, and this lamp will not light upon pressing the button, but the red light will be bright indicating that the electrolyte is dangerously low, and should be replenished.

The plug 8 is preferably made of lead, and is arranged to be inserted through one of the removable caps 24 through which the electrolyte is supplied to the battery. The vent hole 25 in the cap 24 is not closed, a space around the plug 8 permitting the free exit of gases.

The lamps used are preferably such as are used in small flash lights, although other lamps may be used if the resistances are modified accordingly.

I claim:

1. An electrolyte level indicator comprising a contactor having a relatively large diameter at one cross section and a smaller diameter at a lower cross section, and arranged to project point downward into the surface of an electrolyte, white and red indicating lamps, a circuit closer, and circuits connecting the contactor, lamps, and circuit closer, whereby upon closing the circuit a white lamp will be bright and a red lamp will not be bright when the surface of the electrolyte is on the large diameter of the contactor, and the lamps will be bright in the reverse order when the surface of the electrolyte is on the small diameter of the contactor and also when the electrolyte is below the contactor.

2. An electrolyte level indicator for storage batteries, comprising a cone shaped contactor arranged in a depending position to contact with the surface of an electrolyte, a double contact push button, white and red indicating lamps, parallel circuits connecting the double contacts of the push button and lamps, one of said parallel circuits including a resistance and connecting with a battery terminal, a third circuit connected with an opposite battery terminal and arranged to be connected in series with the parallel circuits and including a resistance and leading to the push button, whereby upon closing the circuit a white lamp will be bright and a red lamp will be dim when the surface of the electrolyte is on the large diameter of the contactor, and the lamps will be bright in the reverse order when the surface of the electrolyte is on the small diameter of the contactor and also when the electrolyte is below the contactor.

3. In an electrolyte level indicator, a cone shaped contactor, said contactor placed in a downwardly pointing position and arranged to be immersed in the electrolyte to a greater or less extent on the sloping sides of the cone as the level of the electrolyte changes, switches, white and red indicating lamps, and electric circuits including the contactor, switches, lamps and electrolyte, whereby upon closing the circuit a white lamp will be bright and a red lamp will not be bright when the surface of the electrolyte is on the large diameter of the contactor, and the lamps will be bright in the reverse order when the surface of the electrolyte is on the small diameter of the contactor and also when the electrolyte is below the contactor.

4. The method of indicating the level of the electrolyte of a storage battery which comprises producing relatively great variations in the resistance at the surface contact between said electrolyte and a contactor with minor changes in the level of the electrolyte, a plurality of circuits each containing indicating means through which currents flow to actuate said indicating means, said currents varied by the change in resistance at the contactor and electrolyte level, and indicating a high level of the electrolyte by an increase in the current in one circuit and a simultaneous decrease in current in a second circuit, and a low level of the electrolyte by a decrease in current in the first circuit and an increase in current in the second circuit.

In testimony whereof I hereby affix my signature.

CHARLES R. WELSH.